W. T. DONNELLY.
DREDGING APPARATUS.
APPLICATION FILED APR. 27, 1910. RENEWED JAN. 25, 1912.
1,019,610.
Patented Mar. 5, 1912.
2 SHEETS—SHEET 2.
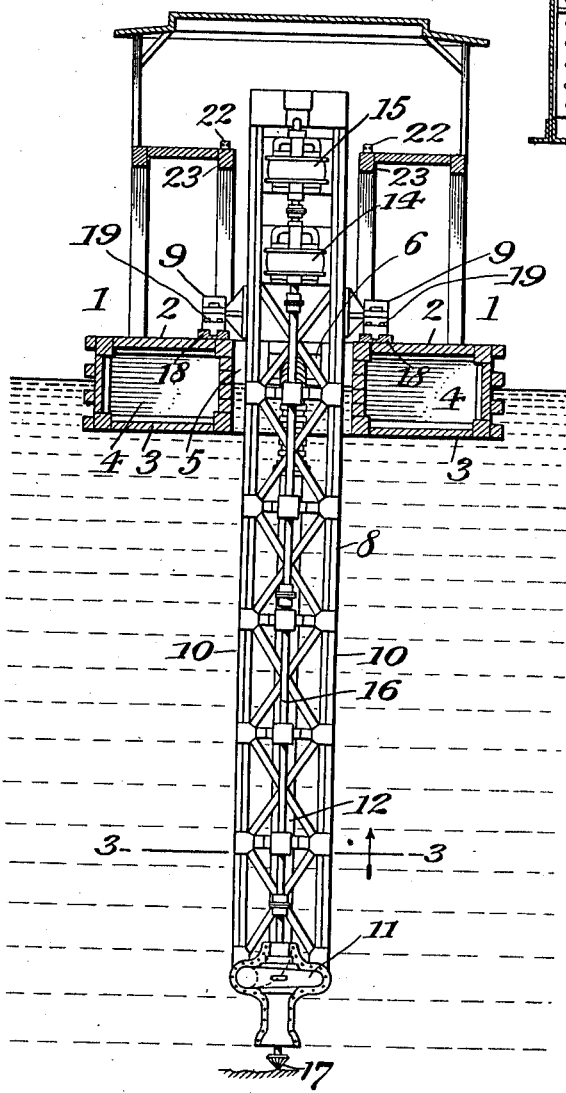
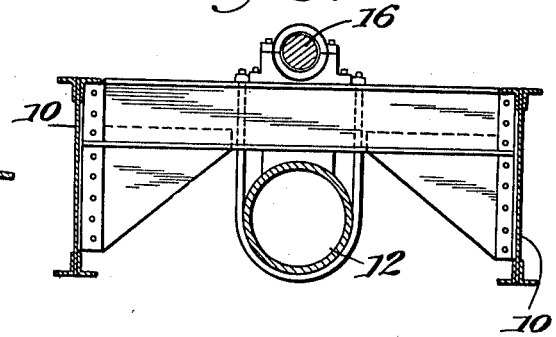
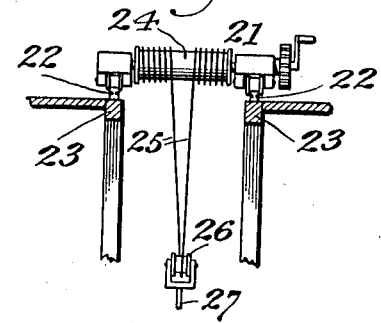
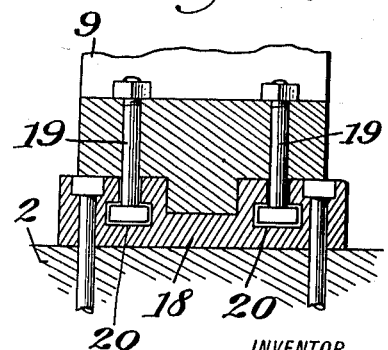
WITNESSES
INVENTOR
William Thomas Donnelly
BY Blackwood Bros
ATTORNEYS.

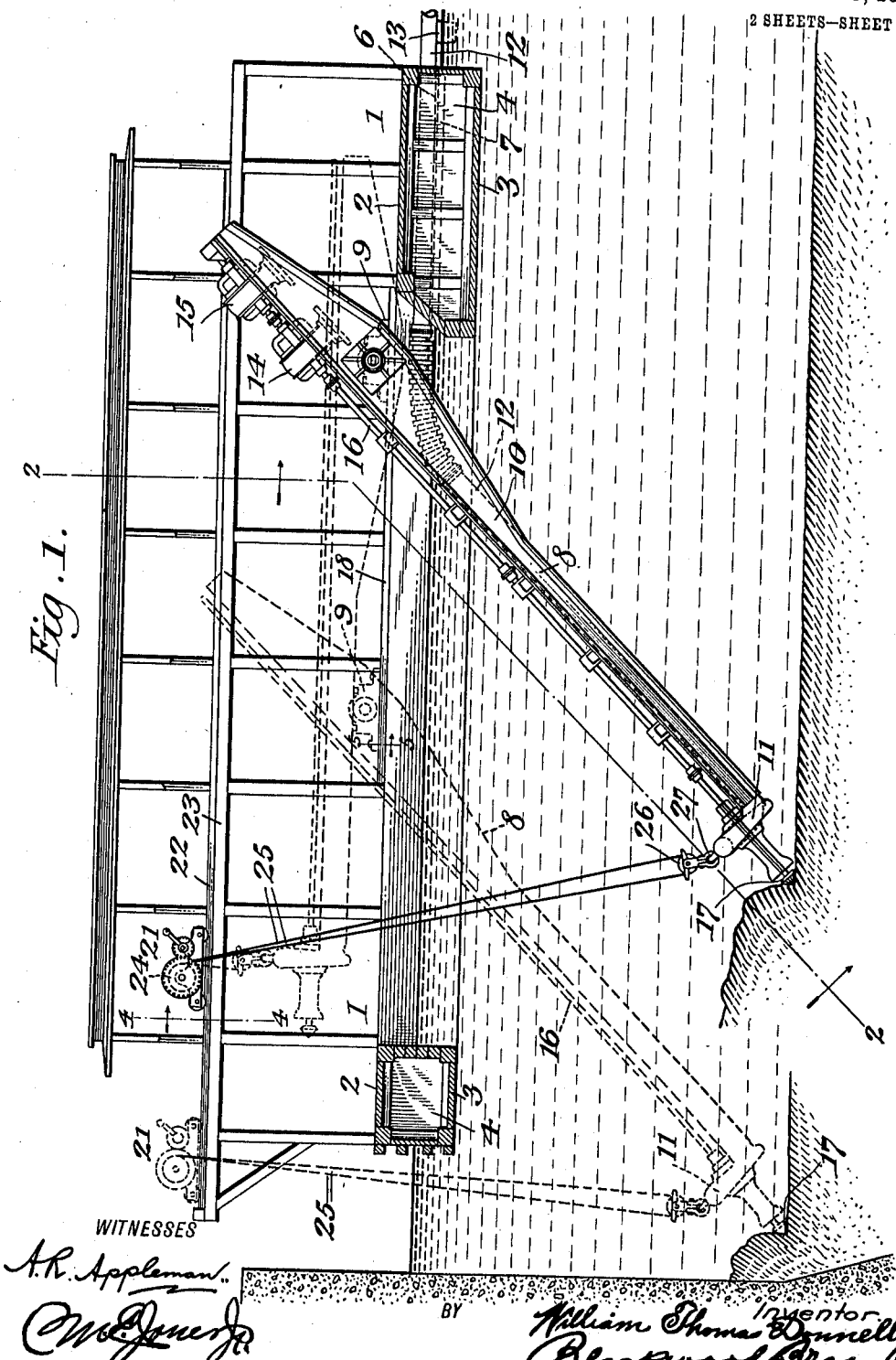

UNITED STATES PATENT OFFICE.

WILLIAM THOMAS DONNELLY, OF BROOKLYN, NEW YORK.

DREDGING APPARATUS.

1,019,610. Specification of Letters Patent. Patented Mar. 5, 1912.

Application filed April 27, 1910, Serial No. 557,978. Renewed January 25, 1912. Serial No. 673,494.

*To all whom it may concern:*

Be it known that I, WILLIAM THOMAS DONNELLY, a citizen of the United States, residing at Brooklyn, in the county of Kings and State of New York, have invented certain new and useful Improvements in Dredging Apparatus, of which the following is a specification.

My invention relates to dredging apparatus.

It has for its object to provide as a feature of the apparatus, a cutter adapted to be brought into contact with stone or other hard substances forming the bottoms of rivers, lakes, canals and other bodies of water and cut it away.

It has for a further object to provide as another feature of the apparatus, a centrifugal pump adapted to be submerged to a point adjacent the bottom of a body of water, to take up therefrom, through its suction opening, the soft mud, sand, earth and the hard substances cut away by the cutter.

It has for a further object to provide as another feature of the apparatus, a pipe leading from the discharge opening of the pump adapted to convey the material taken up by the pump to the shore or other place, where it is desired to place it.

It has for a further object to provide as another feature of the apparatus, a conveniently located source of power for driving the rotatable element of the pump and the cutter.

It has for a further object to provide as another feature of the apparatus, means for directly connecting the rotatable elements of the source of power and the pump and the cutter.

It has for a further object to provide as another feature of the apparatus, a fulcrumed and slidable arm and to mount thereon, the cutter, pump, source of power and the pipe leading from the pump, so as to adapt them to be moved together to the position required by the nature of the work to be performed.

It has for a further object to provide as another feature of the apparatus, means for effecting the raising and lowering of the fulcrumed arm.

It has for a still further object to provide an apparatus of the character and for the purpose above set forth embodying advantages in point of simplicity, compact and durable construction.

In the drawings: Figure 1 is a longitudinal vertical sectional view of my dredging apparatus. Fig. 2, a transverse vertical sectional view taken on the line 2—2 of Fig. 1. Fig. 3, a transverse sectional view on an enlarged scale of the fulcrumed arm, taken on the line 3—3 of Fig. 2. Fig. 4, a transverse vertical sectional view taken on the line 4—4 of Fig. 1. Fig. 5, a transverse vertical sectional view taken on the line 5—5 of Fig. 1.

Referring to the accompanying drawings illustrating my invention and in which like reference characters designate corresponding parts, 1 designates a scow which is of the dimensions and displacement required for the weight it is intended to carry. The scow is provided with a deck 2 above its bottom 3, between which is formed an air compartment 4. A rectangular shaped well 5 extends longitudinally of the scow and is formed by removing part of the bottom and deck of the scow and providing walls, at each end and at its sides, which extend from the bottom to the deck. A channel 6 leads from the well out through the stern of the scow and is formed by removing a portion of the stern wall of the scow and a portion of the rear wall of the well and providing a floor 7 and side walls which extend from the stern wall of the scow to the rear wall of the well. An arm 8 is fulcrumed adjacent its upper end in bearings 9 on the deck of the scow over the well and when its lower end is lowered into the water, through the well, the upper end will extend out of the top of the well. The arm is constructed of two parallel side plates 10, spaced apart and connected by pairs of diagonal cross-braces.

A centrifugal pump 11 is mounted on the lower end of the arm 8 and provided with a downwardly extending flared inlet into which the material to be removed from the bottom of the body of water is sucked and a pipe 12, to receive the discharge from the pump, leads from the outlet thereof, along the arm, through the channel 6 and over floats 13, which support it above the water, to the shore or other place where it is desired to convey the material. Motors 14 and 15 are mounted on the upper end of the arm and the shafts of their rotary elements are coupled together so that they act together as a source of power. A shaft 16, mounted in bearings on the arm 8, is coupled at one end to the shaft of the rotary element of the motor 14 and at the other end to the shaft of the rotary element of the pump, and a cutter 17 is secured on the lower end of the shaft of the rotary element of the pump, thereby forming a direct connection between said rotary elements and the cutter.

While I have shown two motors, a single motor may be employed if its capacity is sufficient.

To adapt the arm 8 to be slid backward and forward and to the position required by the nature of the work which is to be performed, the bearings 9 thereof are mounted upon tracks 18 secured to the deck of the scow and are adapted to be secured at any point on said tracks by means of bolts 19, their heads engaging inverted T shaped grooves 20 in the tracks and their ends extending upwardly through the flanges or feet of the bearing and having threaded nuts on their ends. The heads of the bolts are of such dimensions that when the nuts are loose, said heads will be loose in the grooves 20 and allow the bearing to be slid along the track, but when the nuts are tight the heads thereof will grip the tracks and fix the bearing.

For the purpose of moving the arm 8 on its fulcrum, a crane 21 is provided having wheels which run on tracks 22 secured on top of beams 23 and a rotatable drum 24 operated by a crank arm and to which is secured the ends of a wire cable 25 which runs around a pulley 26 secured to the lower end of the fulcrumed arm 8 by means of a shackle 27.

I do not wish to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

I claim:

1. A dredging apparatus comprising a scow having a well leading through its hull, a reciprocable arm fulcrumed thereon and being adapted to be turned on its fulcrum and lowered through said well into the water to place it in operative position and to be turned on its fulcrum and raised through said well above the bottom of the scow to place it in transportable position, said arm having on the submergible portion thereof at one side of its fulcrum a centrifugal pump, a pipe leading therefrom and cutting means and on the non-submergible portion thereof at the other side of its fulcrum a source of power, and means operatively connecting the pump, the cutting means and the rotatable elements of the source of power, substantially as described.

2. A dredging apparatus comprising a scow having a well leading through its hull, a reciprocable arm fulcrumed thereon and being adapted to be turned on its fulcrum and lowered through said well into the water to place it into operative position and to be turned on its fulcrum and raised through said hull above the bottom of the scow to place it in transportable position, said arm having on the submergible portion thereof, a centrifugal pump, a pipe leading therefrom and cutting means and on the nonsubmergible portion thereof a source of power, and a rotatable shaft directly connecting the rotatable elements of the source of power and the pump and having the said cutting means thereon adjacent the inlet of the pump, substantially as described.

3. A dredging apparatus comprising a scow having a well leading through its hull, a reciprocable arm fulcrumed thereon and being adapted to be turned on its fulcrum and lowered through said well into the water to place it in operative position and to be turned on its fulcrum and raised through said well above the bottom of the scow to place it in transportable position, said arm having on the submergible portion thereof at one side of its fulcrum a centrifugal pump, a pipe leading therefrom and cutting means and on the nonsubmergible portion thereof at the other side of its fulcrum a source of power, and a rotatable shaft directly connecting the rotatable elements of the source of power and the pump and having the said cutting means thereof adjacent the inlet of the pump, substantially as described.

In testimony whereof I have signed my name in the presence of two subscribing witnesses.

WILLIAM THOMAS DONNELLY.

Witnesses:
WALTER C. KANE,
M. E. JONES, Jr.

---

Copies of this patent may be obtained for five cents each, by addressing the "Commissioner of Patents, Washington, D. C."